(12) United States Patent
Liu

(10) Patent No.: US 7,775,673 B1
(45) Date of Patent: Aug. 17, 2010

(54) NON-BACKBOARD REFLECTOR MIRROR

(76) Inventor: Cheng-Shun Liu, 1F., No. 3, Lane 220, Hsieh Chen Rd., Sanhsia Chen, Taipei Hsien (TW)

( * ) Notice: Subject to any disclaimer, the term of this patent is extended or adjusted under 35 U.S.C. 154(b) by 402 days.

(21) Appl. No.: 11/984,337

(22) Filed: Nov. 16, 2007

(51) Int. Cl.
*G02B 7/182* (2006.01)

(52) U.S. Cl. ................................ 359/881; 248/480

(58) Field of Classification Search ............... 359/868, 359/871, 872, 875, 881; 248/476, 480
See application file for complete search history.

(56) References Cited

U.S. PATENT DOCUMENTS 2,097,129 A * 10/1937 Miserendino ............... 248/480
3,377,117 A * 4/1968 Biscow ...................... 359/549
3,698,798 A * 10/1972 Bolton ....................... 359/881

\* cited by examiner

*Primary Examiner*—Alessandro Amari
(74) *Attorney, Agent, or Firm*—Jackson IPG PLLC

(57) ABSTRACT

A non-backboard reflector mirror includes a mirror body with a rim, a locating bar affixed to the back side of the rim of the mirror body, a locating frame, which has a clamping portion coupled to the locating bar and movable along and rotatable relative to the locating bar and affixed thereto at the desired elevation and angle, and a mounting frame selectively fastened to an array of mounting through holes at the locating frame at the desired angle for installation in a ceiling, overhead wall, or vertical wall, short wall. An alternate mounting frame may be used for installation in a post so that the non-backboard reflector mirror is used as a traffic mirror.

10 Claims, 17 Drawing Sheets

NON-BACKBOARD REFLECTOR MIRROR

BACKGROUND AND SUMMARY OF THE INVENTION

The present invention relates to a reflector mirror and more particularly, to a non-backboard reflector mirror that is adjustable horizontally as well as vertically to fit different mounting requirements and to offer a wide application range.

A conventional reflector minor, as shown in FIGS. 1 and 2, is essentially comprised of a backboard 61, a mirror 62, a ball-head rod member 63, an inner socket member 64, an outer socket member 65, a mounting bar 67, a connection bar 66, and a bracket 68. This design of reflector mirror has numerous drawbacks as follows:

1. Because the reflector mirror consists of a big number of component parts, the installation of the reflector mirror requires much labor and time.

2. The elevation and angle of the backboard 61 and minor 62 are not adjustable relative to the mounting bar 67 and the connection bar 66 can only be adjusted relative to the bracket 68 in horizontal within a limited angle, and therefore the application of the reflector mirror is limited.

3. After coupling of the ball head of the ball-head rod member 63 to the inner socket member 64 and the outer socket member 65, the ball-head rod member 63 may still be forced to rotate relative to the inner socket member 64 and the outer socket member 65 when the backboard 61 or minor 62 bears a strong wind force.

FIGS. 3-5 show another prior art design of reflector minor according to U.S. Pat. No. 5,909,327, which is an invention of the present inventor, entitled "Convex lens assembly for monitoring". According to this design, the convex lens assembly is comprised of a backboard 71 holding a convex lens 72, locating frames 73 and 74, and mounting frames 75 and 76.

This design of reflector mirror also has minor drawbacks as follows:

1. Because the reflector mirror consists of a big number of component parts, the installation of the reflector mirror requires much labor and time.

2. The mounting frames 75 and 76 are affixed to the center part of the back side of the backboard 71, and the backboard 71 is not adjustable relative to the mounting frames 75 and 76 in horizontal direction or vertical direction. Therefore, the reflector mirror cannot be adjusted to fit different mounting requirements.

The present invention has been accomplished under the circumstances in view. It is one object of the present invention to provide a non-backboard reflector mirror, which consists of a less number of component parts, saving much the manufacturing cost and installation time and labor.

It is another object of the present invention to provide a non-backboard reflector mirror, which allows adjustment vertically as well as horizontally to the desired angle to fit different mounting requirements and to offer a wide application range.

It is still another object of the present invention to provide a non-backboard reflector mirror, which can be installed in a ceiling, overhead wall, vertical wall, or short wall.

It is still another object of the present invention to provide a non-backboard reflector mirror, which can be used as a traffic mirror as well as for monitoring purpose.

To achieve these and other objects of the present invention, the reflector mirror comprises a mirror body with a rim, a locating bar affixed to the back side of the rim of the mirror body, a locating frame, which has a clamping portion coupled to the locating bar and movable along and rotatable relative to the locating bar and affixed thereto at the desired elevation and angle, and a mounting frame selectively fastened to an array of mounting through holes at the locating frame at the desired angle for installation in a ceiling, overhead wall, or vertical wall, short wall. In an alternate form of the present invention, the mounting frame is made connectable to a post so that the non-backboard reflector mirror can be used as a traffic mirror or for monitoring purpose.

BRIEF DESCRIPTION OF THE DRAWING

FIG. 2 is a schematic assembly view of the reflector mirror shown in

FIG. 1.

DETAILED DESCRIPTION OF THE INVENTION

Figure 1:
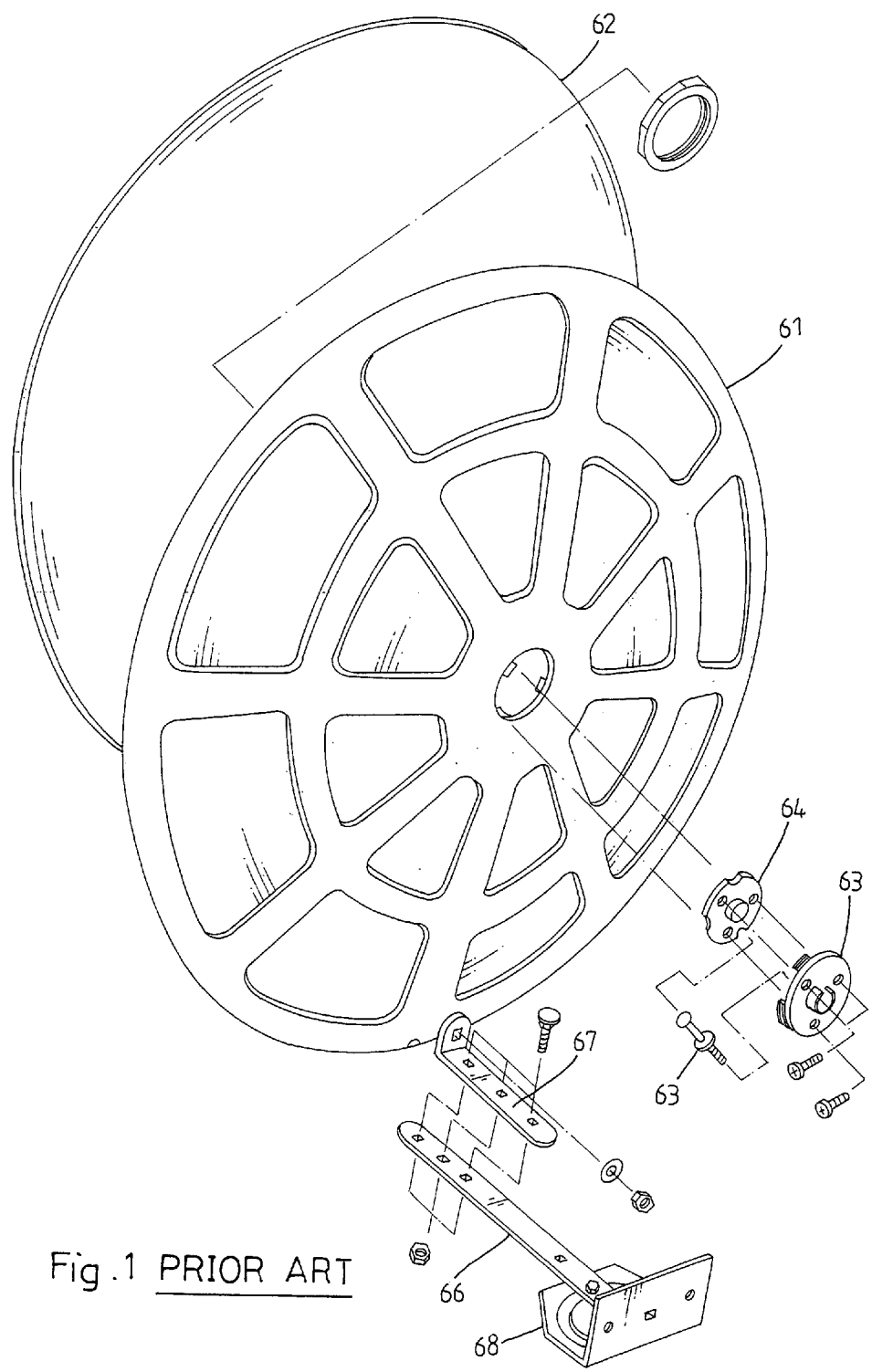
FIG. 1 is an exploded view of a reflector mirror according to the prior art.
Figure 2:
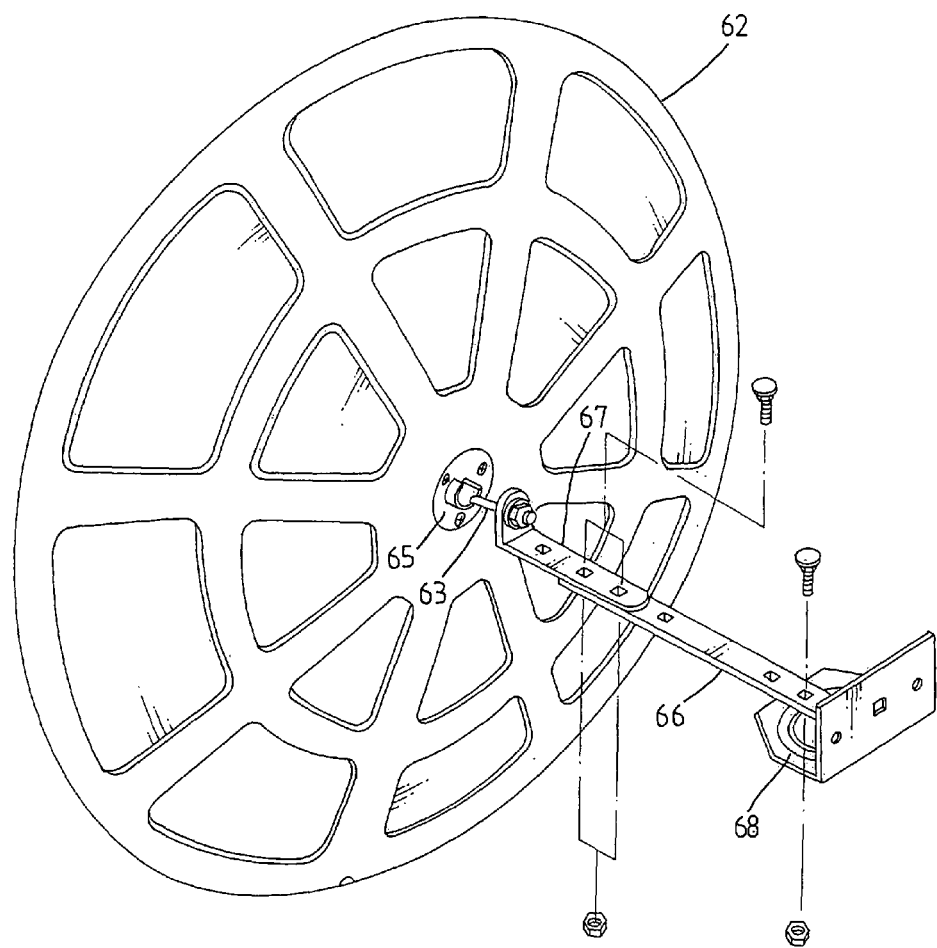
Figure 3:
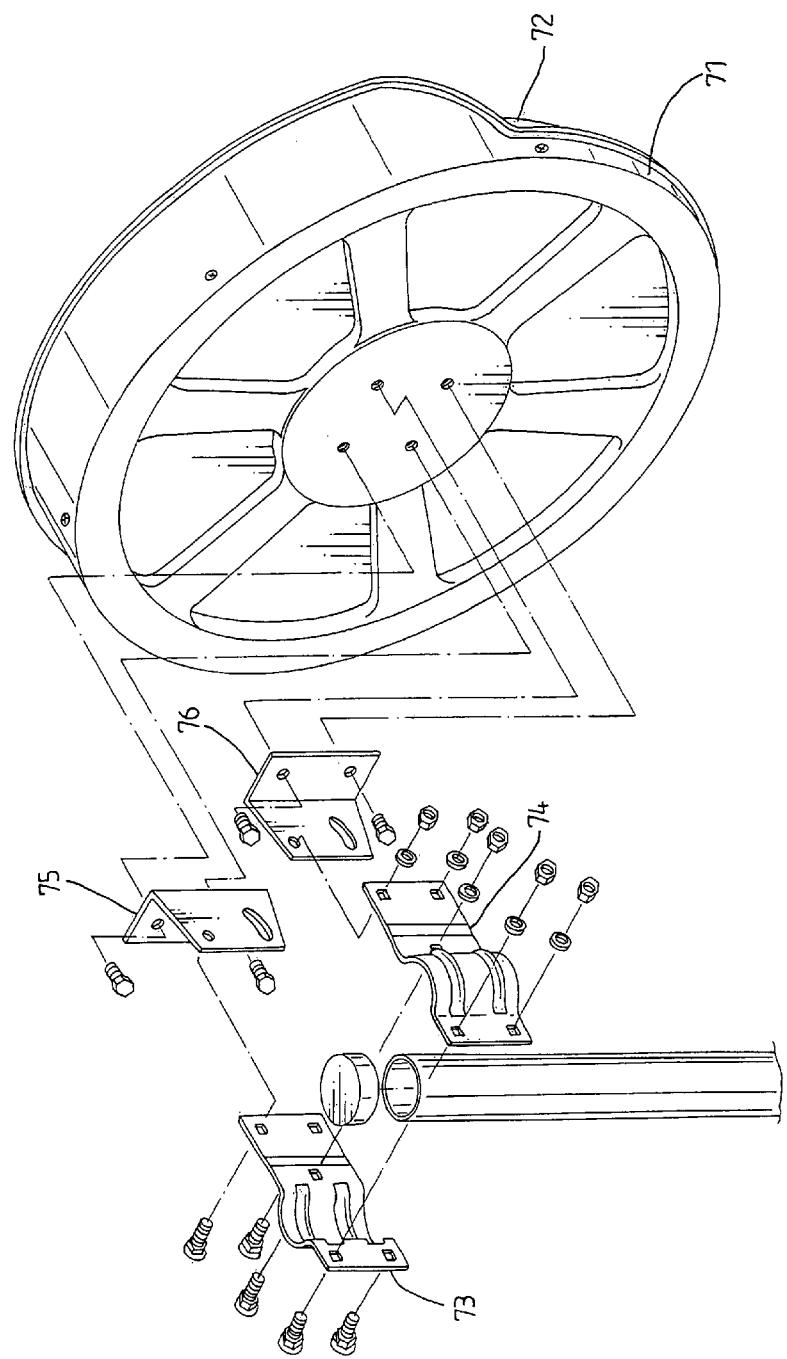
FIG. 3 is an exploded view of a reflector mirror according to U.S. Pat. No. 5,909,327.
Figure 4:
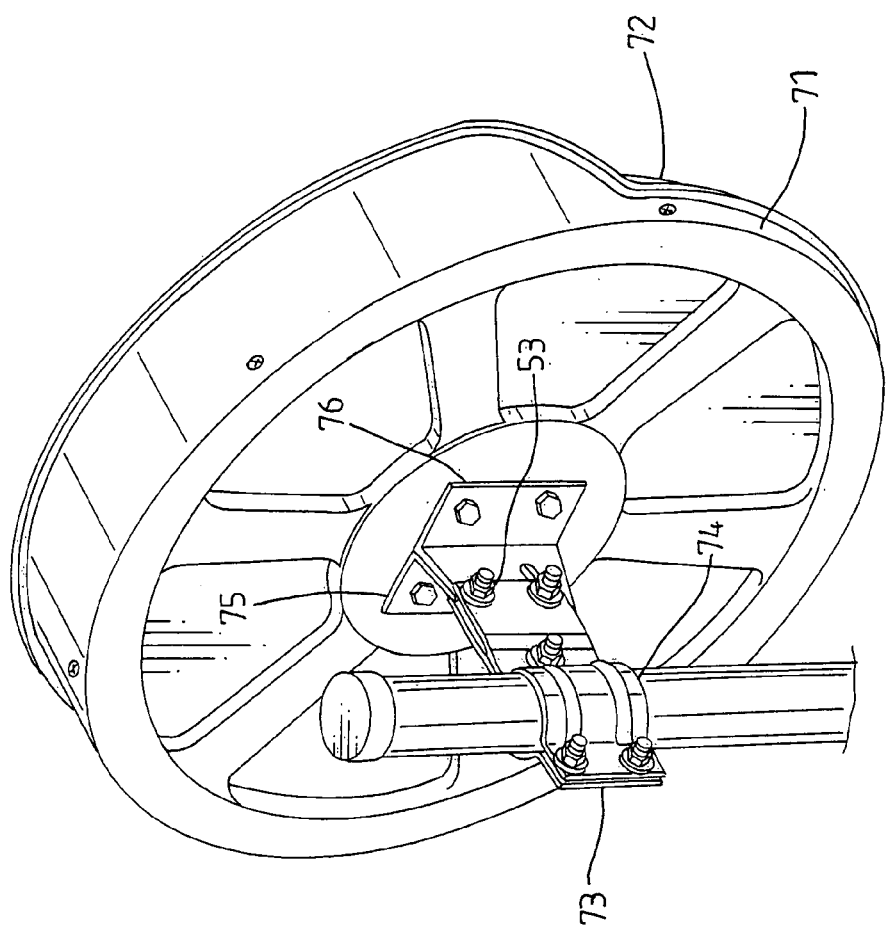
FIG. 4 is an installed view of FIG. 3.
Figure 5:
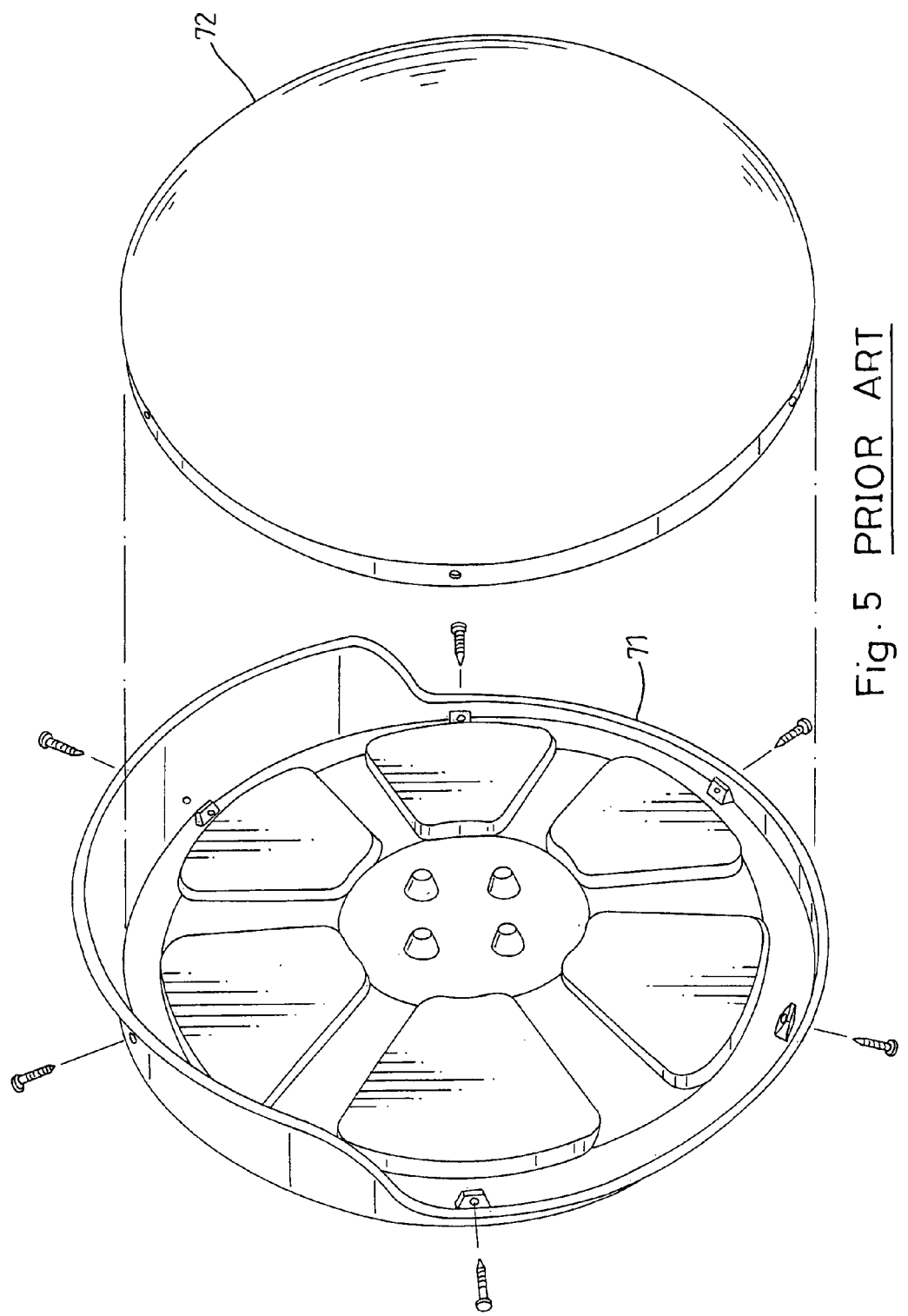
FIG. 5 is an exploded view of the backboard and mirror of the reflector mirror shown in FIG. 3.
Figure 6:
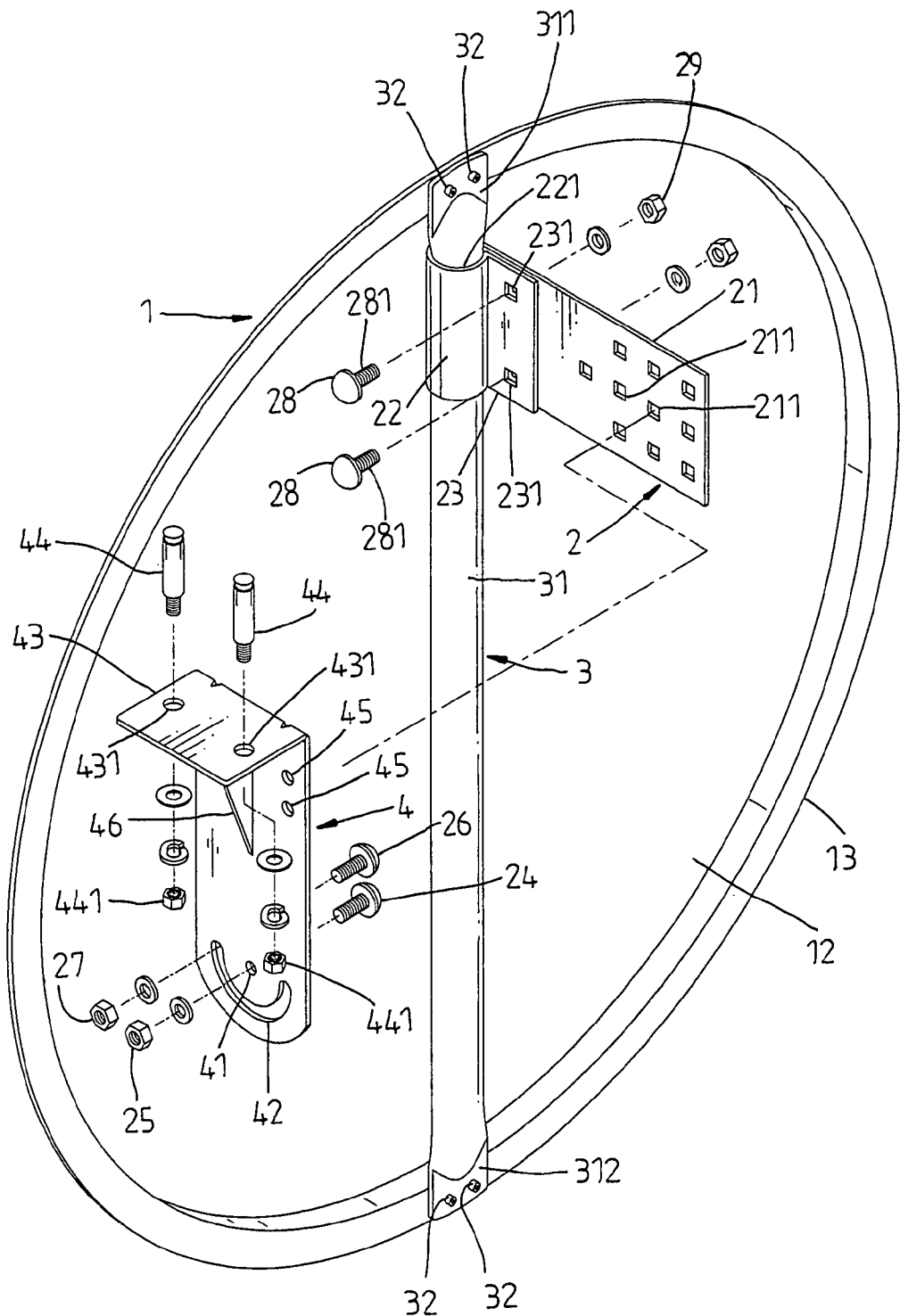
FIG. 6 is an exploded view of a reflector mirror in accordance with a first embodiment of the present invention.
Figure 7:
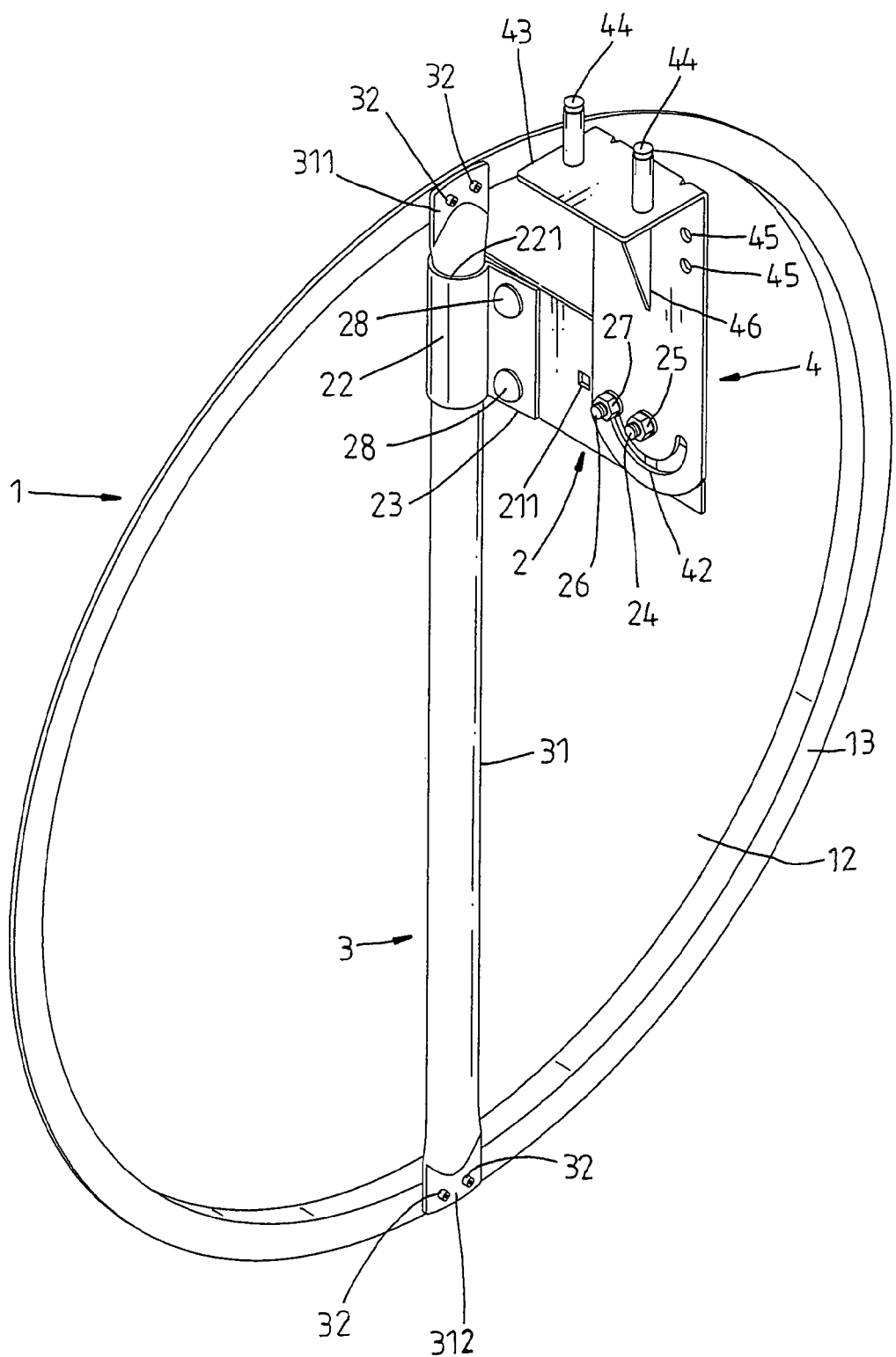
FIG. 7 is an elevational assembly view of the reflector mirror in accordance with the first embodiment of the present invention.

Referring to FIGS. 6~13, a non-backboard reflector mirror 1 in accordance with a first embodiment of the present invention is shown comprised of a mirror body 1, a locating frame 2, a locating bar 3, and a mounting frame 4.

The mirror body 1 has a reflecting mirror surface 11 at the front side, a recess 12 at the back side opposite to the reflecting mirror surface 11, and a rim 13 extending around the periphery. Further, the mirror body 1 can be made out of stainless steel, or plastics, for example, polycarbonate.

Figure 8:
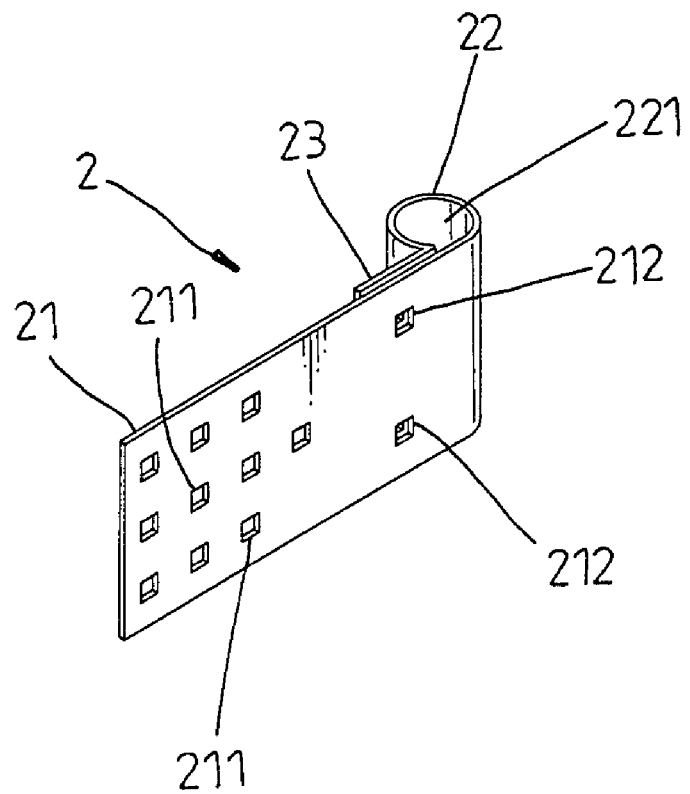
FIG. 8 is an elevational view of the locating frame for the reflector mirror in accordance with the first embodiment of the present invention.
Figure 9:
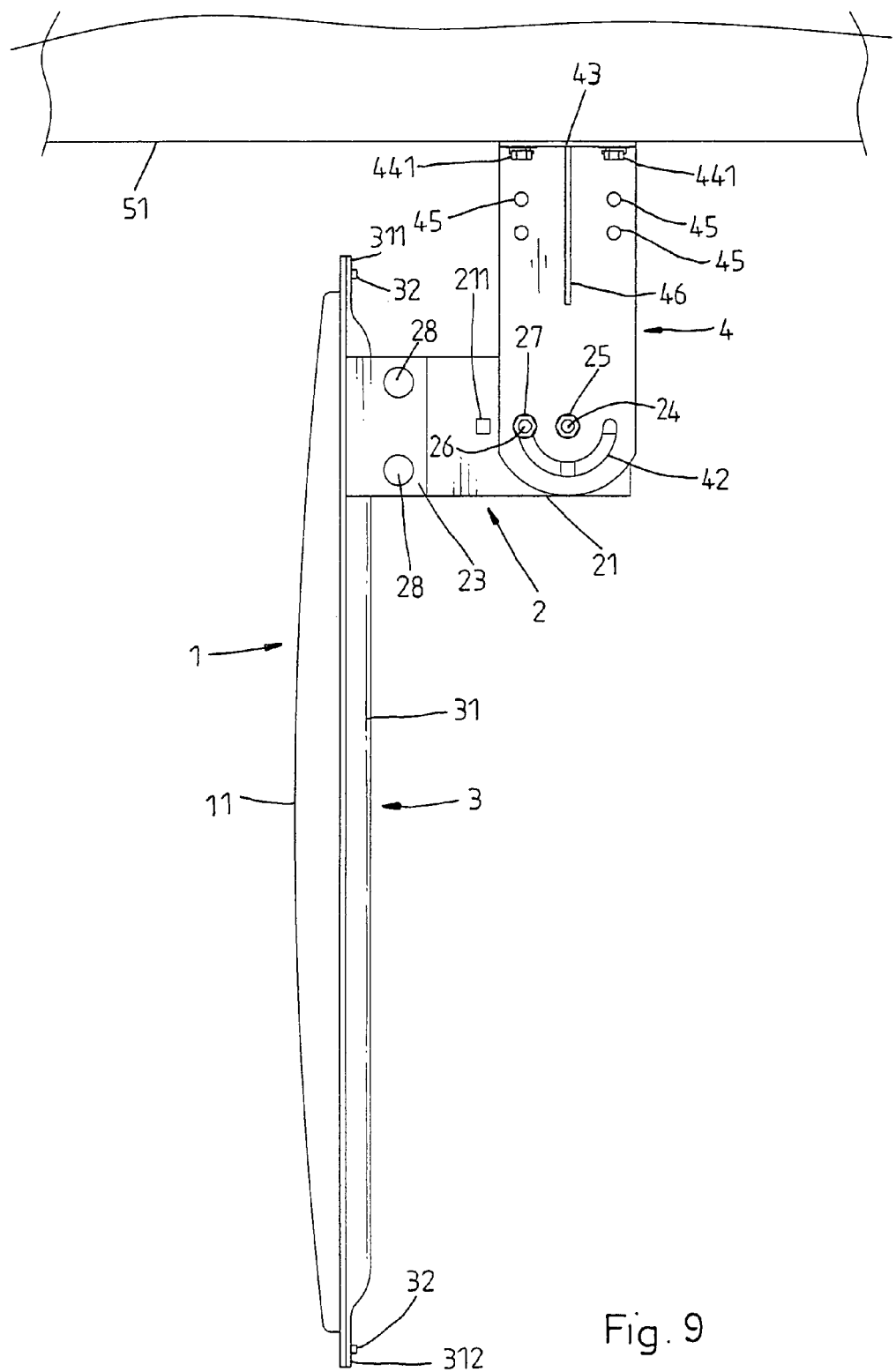
FIG. 9 is a schematic drawing showing an installation example of the reflector mirror in accordance with the first embodiment of the present invention.
Figure 10:
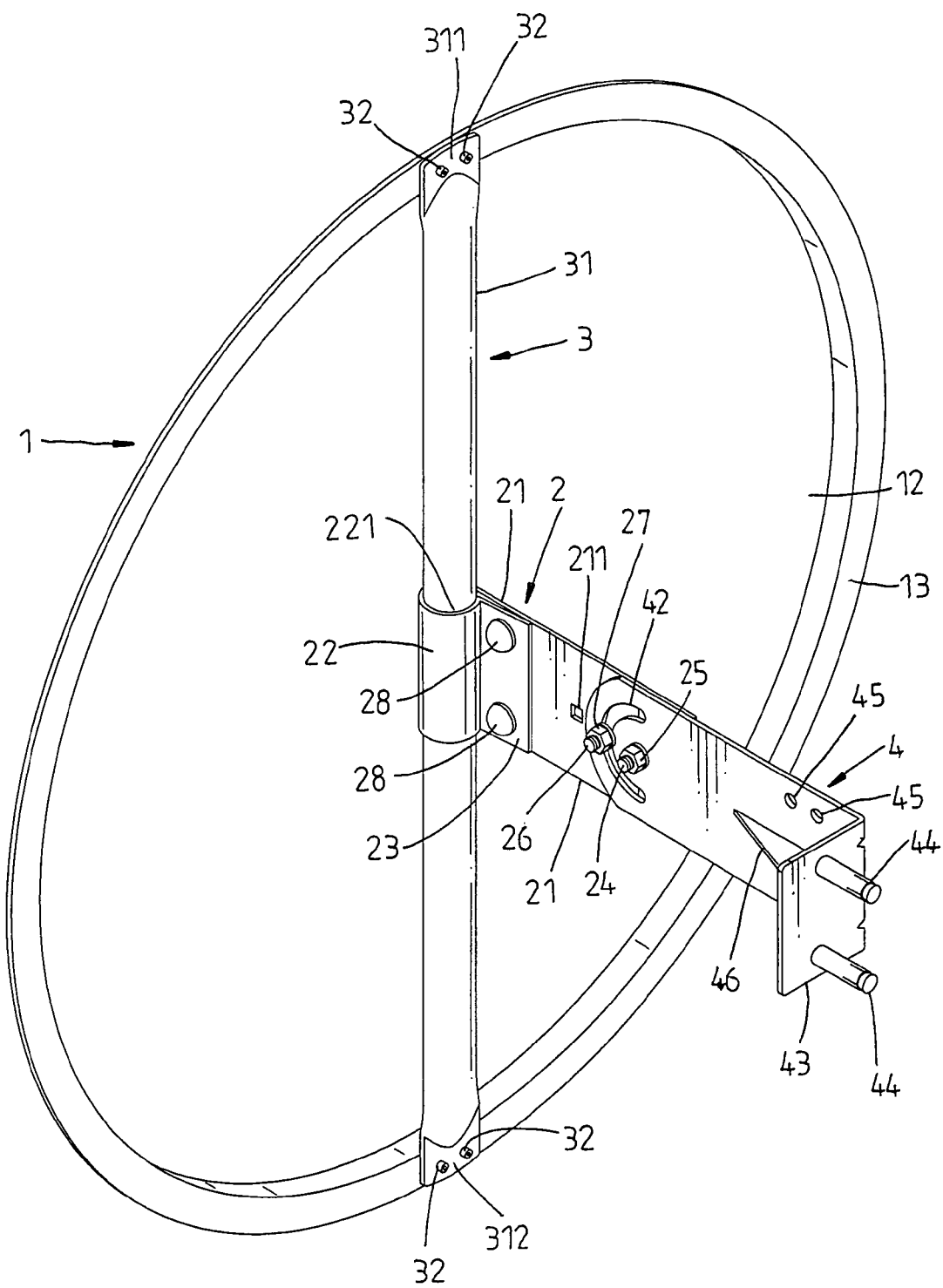
FIG. 10 is an elevational view of the reflector mirror according to the first embodiment of the present invention, showing the mounting frame set in a parallel manner relative to the locating frame.
Figure 11:
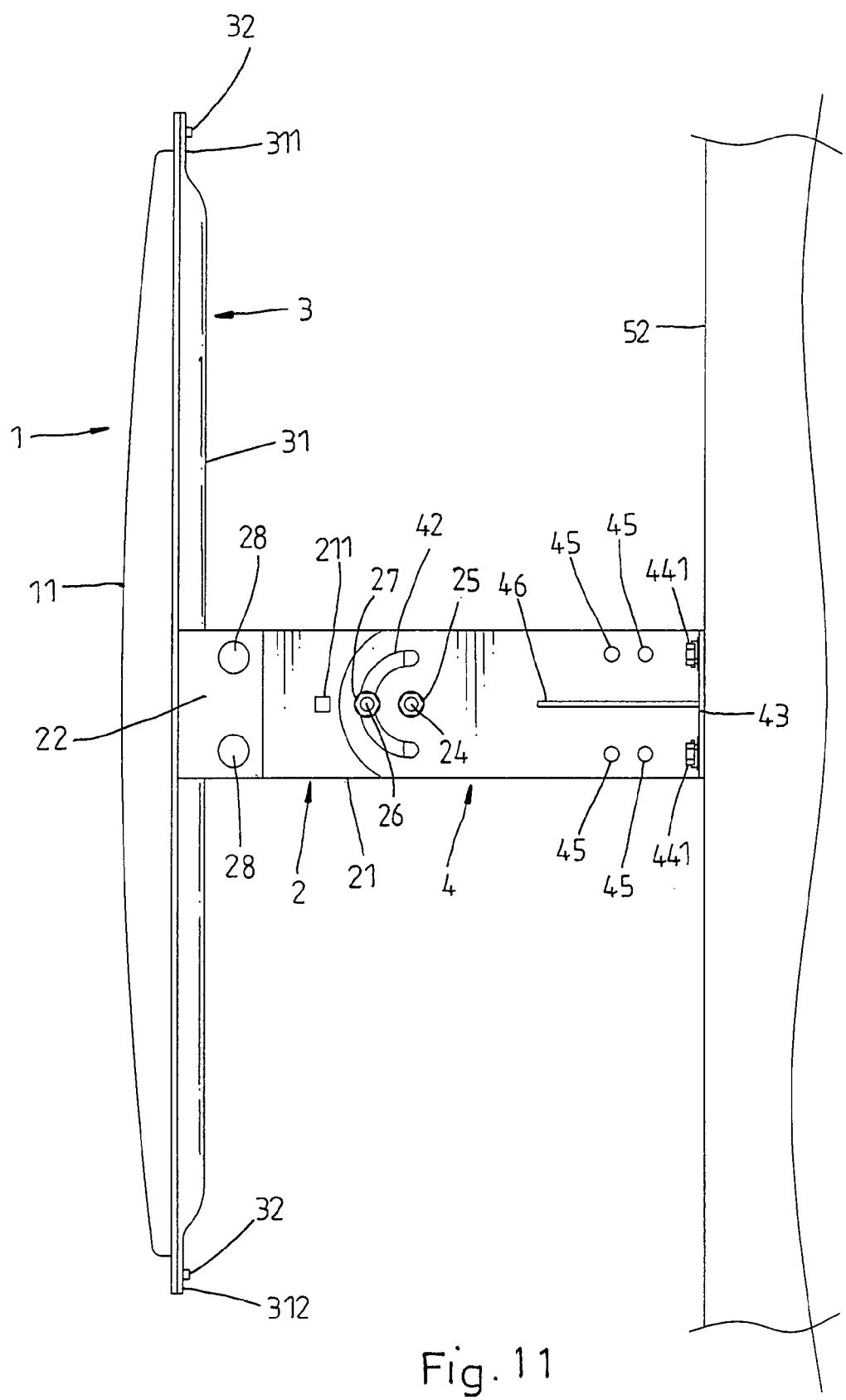
FIG. 11 is a schematic drawing showing another installation example of the reflector mirror in accordance with the first embodiment of the present invention.
Figure 12:
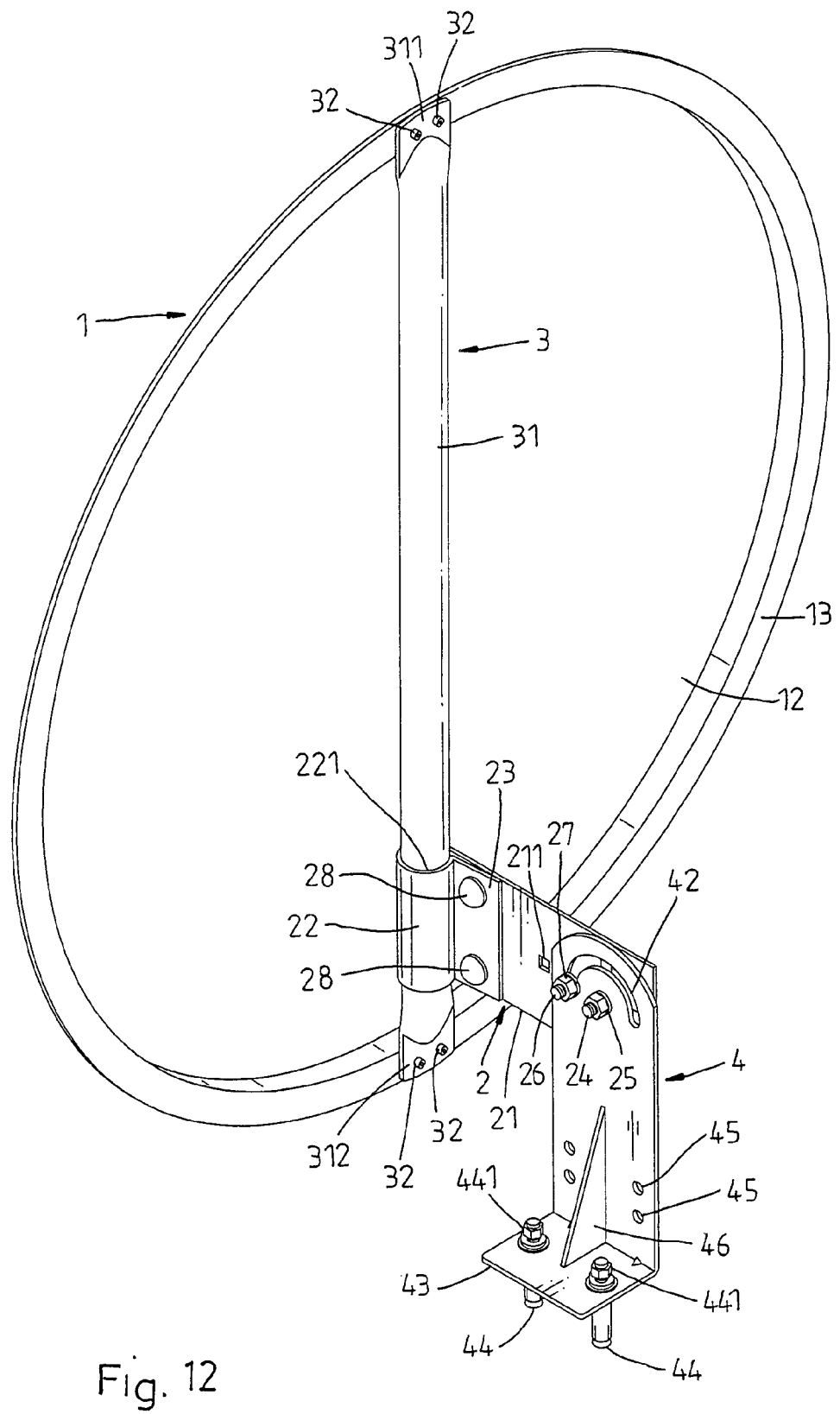
FIG. 12 is an elevational view of the reflector mirror according to the first embodiment of the present invention, showing the mounting frame set in a downwardly extending position relative to the locating frame.
Figure 13:
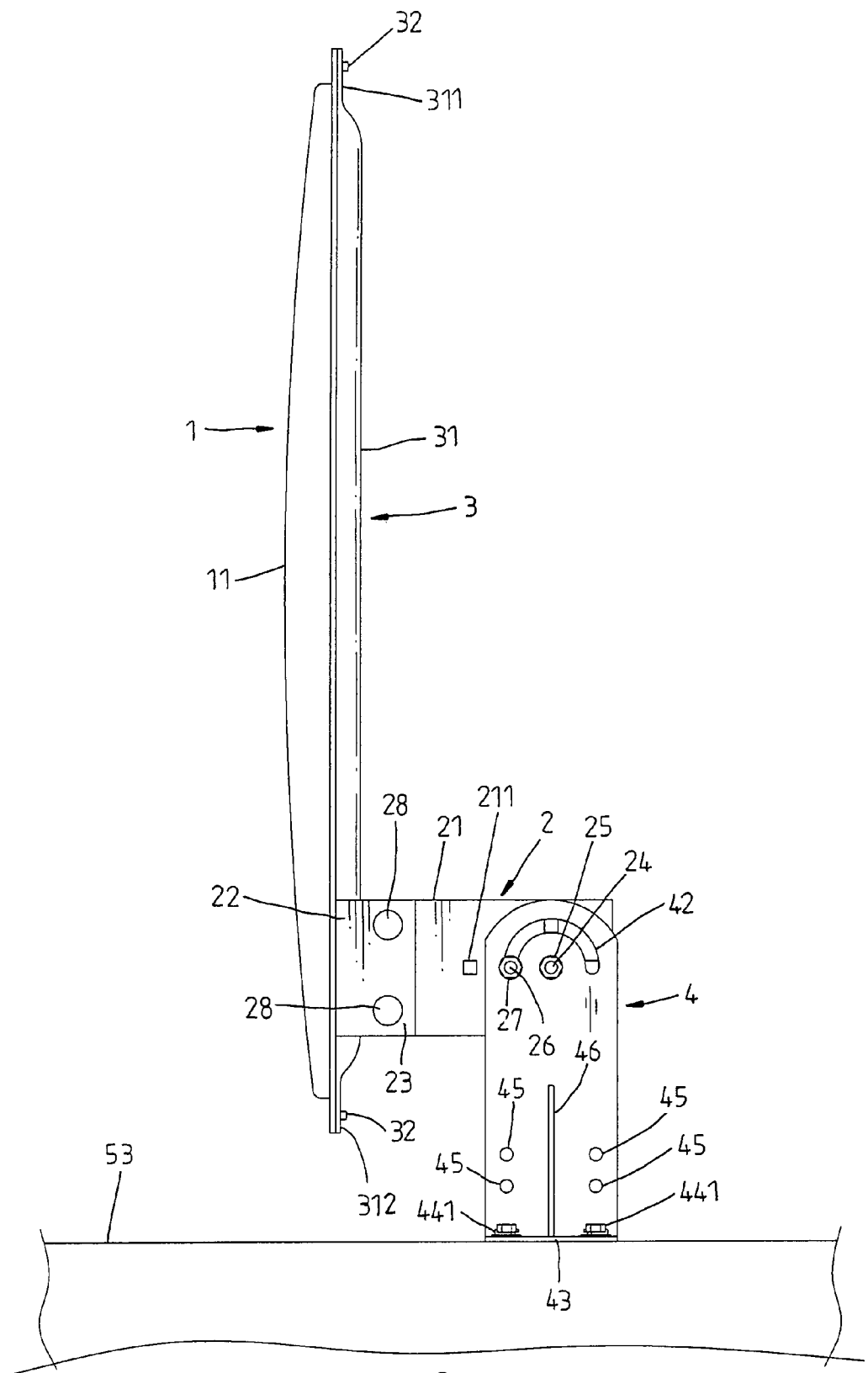
FIG. 13 is a schematic drawing showing an installation example of the reflector mirror in accordance with the first embodiment of the present invention.
Figure 14:
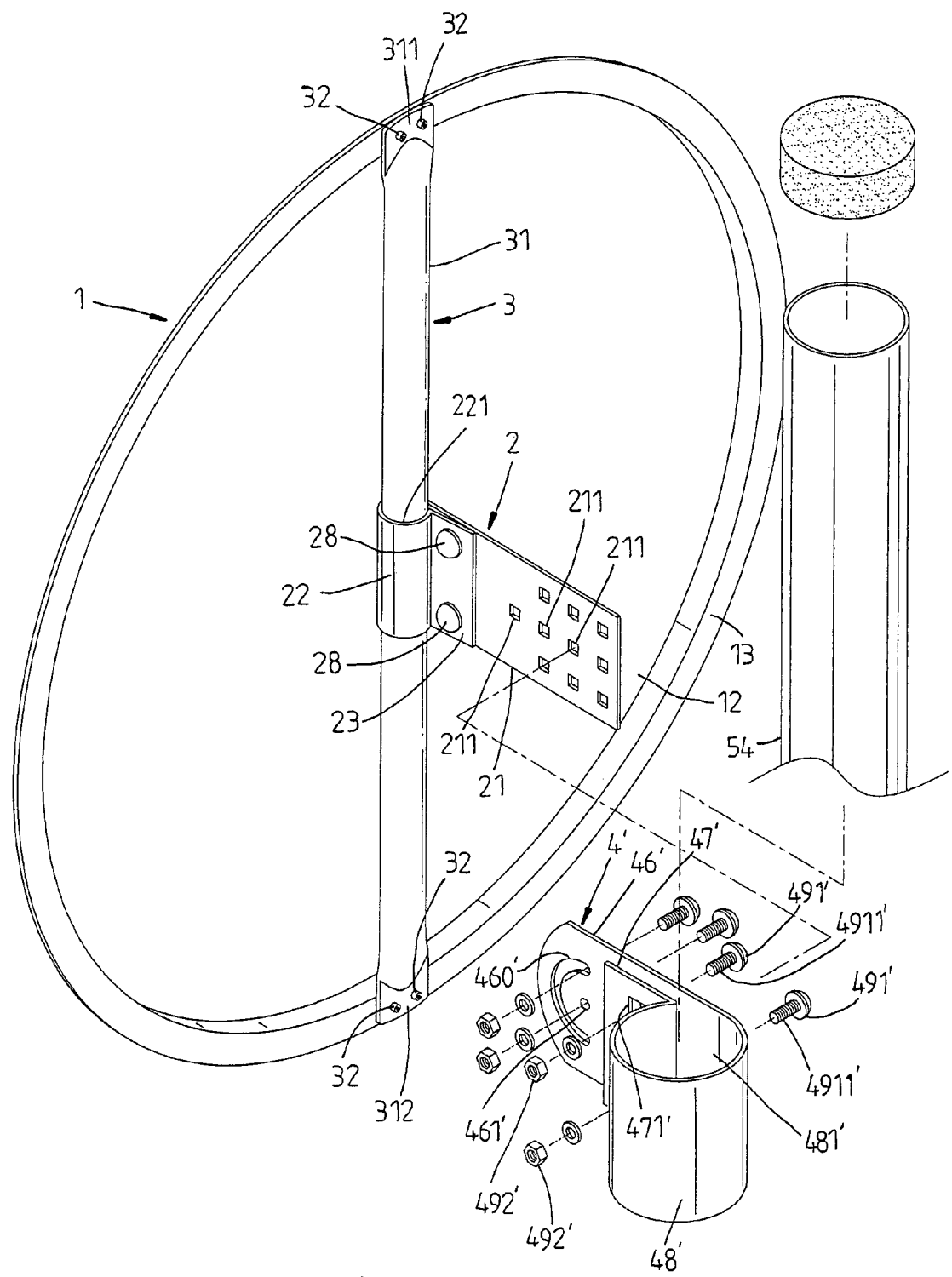
FIG. 14 is an exploded view of a reflector mirror in accordance with a second embodiment of the present invention.
Figure 15:
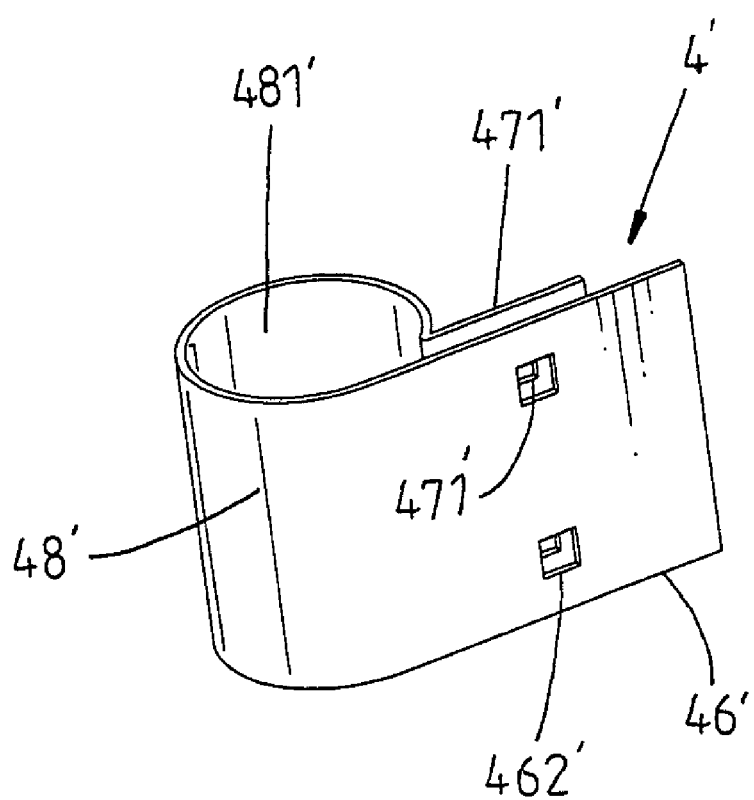
FIG. 15 is an elevational view of the mounting frame for the reflector mirror in accordance with the second embodiment of the present invention.
Figure 16:
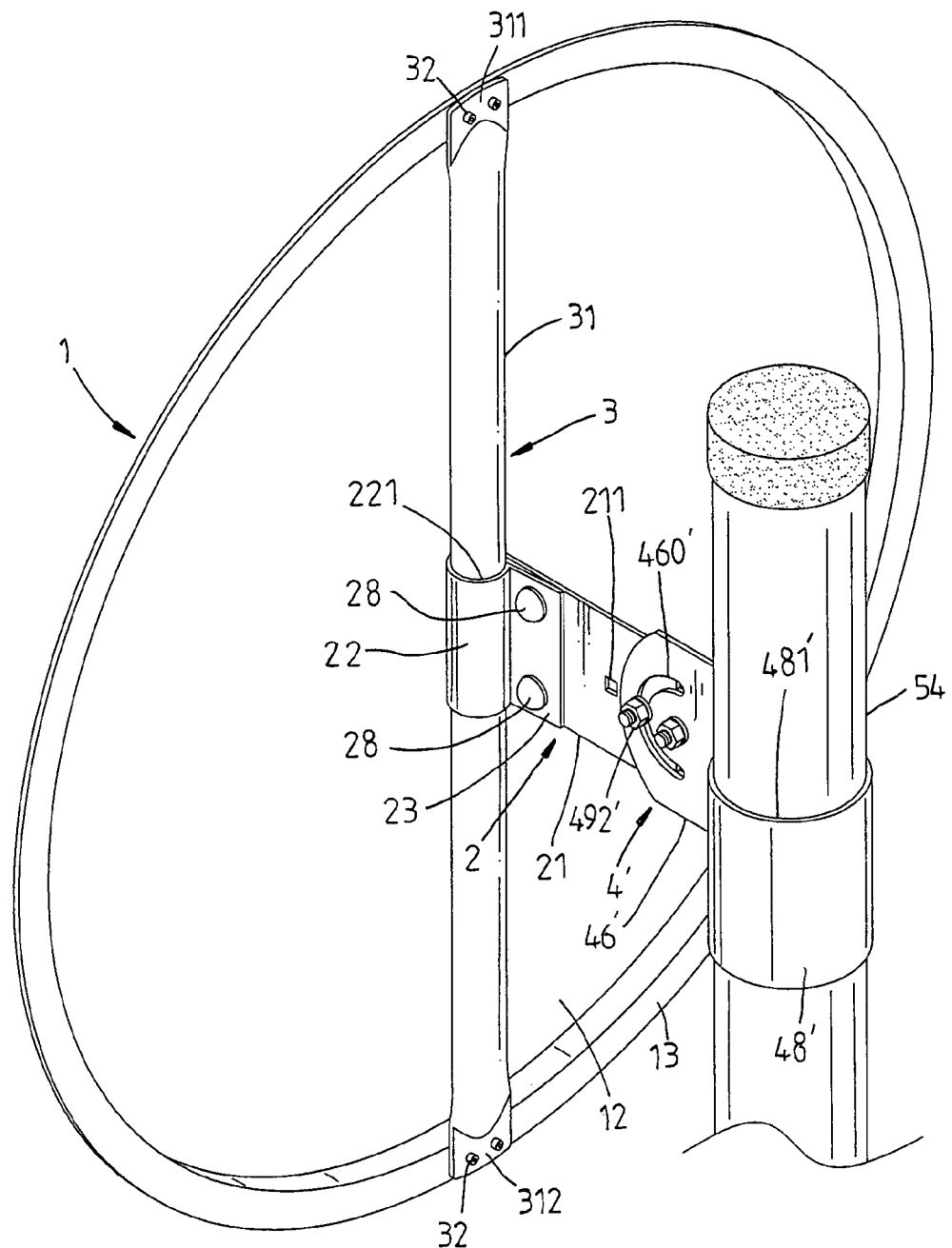
FIG. 16 is a schematic installed view of the reflector mirror in accordance with the second embodiment of the present invention.
Figure 17:
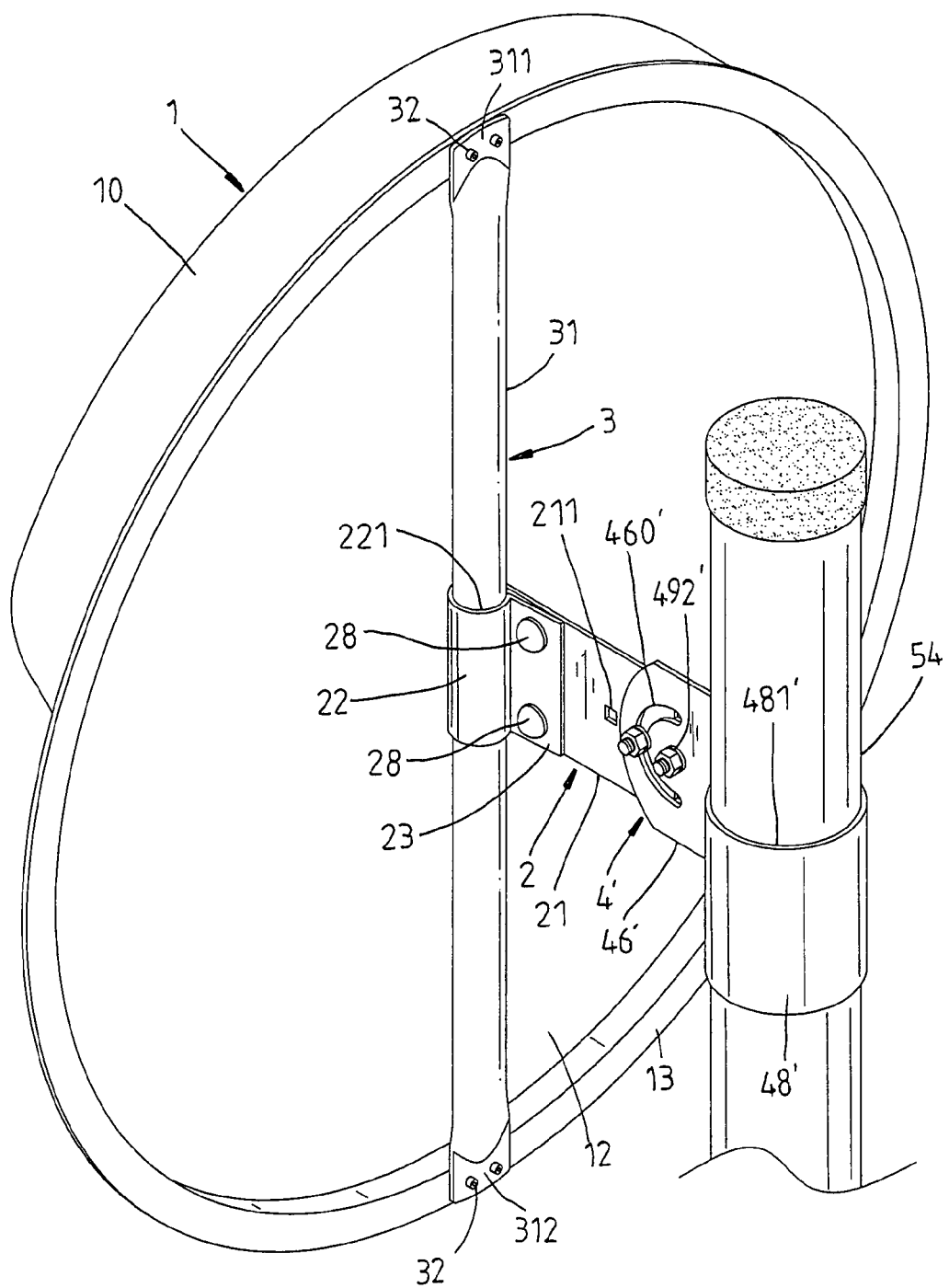
FIG. 17 illustrates the mirror body of the reflector mirror of the second embodiment of the present invention provided with a visor.

The locating frame 2 (see FIG. 8) comprises a flat mounting portion 21, a flat connection portion 23, and an arched clamping portion 22 connected between the flat mounting portion 21 and the flat connection portion 23. The flat mounting portion 21 has a plurality of first mounting through holes 211 arranged in an array remote from the arched clamping portion 22, and a plurality of second mounting through holes 212 arranged at different elevations adjacent to the arched clamping portion 22 (see. FIG. 8). Two of the first mounting through holes 211 are selected and fastened to the mounting frame 4 with screws 24, 26 and nuts 25, 27. The arched clamping portion 22 defines a tubular receiving space 221, which accommodates the locating bar 3. The flat connection portion 23 has a plurality of mounting through holes 231 corresponding to the second mounting through holes 212 of the flat mounting portion 21. The threaded shanks 281 of screws 28 are respectively inserted through the mounting through holes 231 of the flat connection portion 23 and the second mounting through holes 212 of the flat mounting portion 21 and then screwed up with respective nuts 29 to affix the flat connection portion 23 to the flat mounting portion 21, thereby securing the arched clamping portion 22 to the locating bar 3 firmly.

The locating bar 3 is a round bar inserted through the tubular receiving space 221 of the arched clamping portion 22. The two ends of the locating bar 3 are flattened, forming a first flat end portion 311 and a second flat end portion 312. The first flat end portion 311 and the second flat end portion 312 are affixed to the rim 13 of the mirror body 1 with blind rivets 32.

The mounting frame 4 has a mounting through hole 41 and a smoothly arched mounting slot 42 disposed near its one end, a mounting plate 43 perpendicularly extended from its opposite end remote from the mounting through hole 41 and the smoothly arched mounting slot 42. The mounting plate 43 has a plurality of mounting through holes 431 for fastening to a ceiling or overhead wall 51 (see FIG. 9), a vertical wall 52 (see FIG. 11), a short wall 53 (see FIG. 13) or any other support with screws 44 and nuts 441. By means of the mounting through hole 41 and the smoothly arched mounting slot 42, the mounting frame 4 is selectively fastened to the first mounting through holes 211 of the flat mounting portion 21 of the locating frame 2 with screws 24, 26 and nuts 25 and 27.

By means of the composition of the aforesaid component parts, the locating bar 3 can be adjusted to the desired elevation and rotated to the desired angle relative to the locating frame 2 before fixation of the flat connection portion 23 to the flat mounting portion 21. After adjustment of the elevation and angle of the locating bar 3 relative to the locating frame 2, the lat connection portion 23 is affixed to the flat mounting portion 21 with screws 28 and nuts 29. By means of the mounting through hole 41 and the smoothly arched mounting slot 42, the mounting frame 4 can be selectively fastened to the first mounting through holes 211 of the flat mounting portion 21 of the locating frame 2 at the desired elevation and angle with screws 24, 26 and nuts 25 and 27 (see FIG. 7). When the mounting frame 4 is set perpendicular to the locating frame 2 with the mounting plate 43 disposed at the top side, the mounting frame 4 can then be fastened to a ceiling or overhead wall 51 (see FIG. 9). When the mounting frame 4 is set in parallel to the flat mounting portion 21 of the locating frame 2, the mounting frame 4 can then be fastened to a vertical wall 52 (see FIG. 11). When the locating frame 2 is adjusted to the lower side of the locating bar 3 and the mounting frame 4 is set in parallel to the flat mounting portion 21 of the locating frame 2, the mounting frame 4 can then be fastened to a short wall 53 (see FIG. 13) or any other support with screws 44 and nuts 441.

Further, the mounting frame 4 has a plurality of mounting through holes 45 for the mounting of a bracket or extension mounting member (not shown) to affix the non-backboard reflector mirror to a ceiling, overhead wall, vertical wall, short wall or any other support means.

Further, the mounting frame 4 has a reinforcing rib 46 extended to the mounting plate 43 to reinforce the structural strength.

FIGS. 14~17 show a non-backboard reflector mirror in accordance with a second embodiment of the present invention. This second embodiment is substantially similar to the aforesaid first embodiment with exception of the mounting frame. According to this second embodiment, the mounting frame, referenced by 4', comprises a flat mounting portion 46', a flat connection portion 47', and an arched clamping portion 48' connected between the flat mounting portion 46' and the flat connection portion 47'. The flat mounting portion 46' has a first mounting through hole 461' and a smoothly arched mounting slot 460' disposed near its one end for selectively fastening to the first mounting through holes 211 of the flat mounting portion 21 of the locating frame 2 at the desired elevation and angle with screws 491' and nuts 492', and a plurality of second mounting through holes 462' disposed at different elevations adjacent of the arched clamping portion 48' for fastening to the flat mounting portion 46'. The arched clamping portion 48' defines a tubular receiving space 481' for securing to a post 54. The flat connection portion 47' extends from one end of the arched clamping portion 48', having a plurality of mounting through holes 471'. The threaded shanks 4911' of screws 491' are respectively inserted through the second mounting through holes 462' of the flat mounting portion 46' and the mounting through holes 471' of the flat connection portion 47' and then screwed up with respective nuts 492' to affix the flat connection portion 47' to the flat mounting portion 46', thereby securing the arched clamping portion 48' to the post 54 at the desired elevation and angle (see FIG. 16). According to this second embodiment, the locating frame 2 can be fastened to the locating bar 3 at the desired elevation and angle, and the mounting frame 4' can be fastened to the post 54 at the desired elevation and angle. Further, the mirror body 1 can be provided with a visor 10 (see FIG. 17).

As stated above, the invention provides a non-backboard reflector mirror that has the following features and advantages:

1. The non-backboard reflector mirror eliminates the arrangement of a backboard, saving much the manufacturing cost and mounting labor and time.

2. The non-backboard reflector mirror is adjustable horizontally as well as vertically to any desired angle and elevation, fitting different mounting requirements and offering a wide application range.

3. The non-backboard reflector mirror can be installed in a ceiling, overhead wall, vertical wall, short wall, or any other support means.

4. An alternate mounting frame may be used with the non-backboard reflector mirror for fastening to a post or mast for use indoors as well as outdoors, for example, for use as a traffic mirror or for monitoring purpose.

5. The mounting frame has mounting through holes for the mounting of a bracket or extension mounting member to affix the non-backboard reflector mirror to a support.

6. The locating frame and the mounting frame can be made of hot-dip galvanized steel, saving much the manufacturing cost. After installation, no further hot-dip galvanizing processing process is necessary.

What is claimed is:

1. A non-backboard reflector mirror comprising:
   a mirror body, said mirror body having a reflecting mirror surface at a front side thereof and a rim extending around the periphery of aid reflecting mirror surface;
   a locating bar, said locating bar having a first flat end portion and a second flat end portion respectively affixed to the rim of said mirror body with fastening members;
   a locating frame, said locating frame comprising a flat mounting portion, a flat connection portion, and an arched clamping portion connected between said flat mounting portion and said flat connection portion, said flat mounting portion having a plurality of first mounting through holes arranged in an array remote from said arched clamping portion and a plurality of second mounting through holes arranged at different elevations adjacent to said arched clamping portion, said arched clamping portion defining a tubular receiving space, which receives said locating bar, said flat connection portion having a plurality of mounting through holes respectively fastened to the second mounting through holes of said flat mounting portion with screws and nuts to affix said arched clamping portion to said locating bar; and
   a mounting frame for securing said locating frame to a support, said mounting frame having a mounting through hole and a smoothly arched mounting slot disposed near a first end thereof and selectively fastened to the first mounting through holes of said locating frame with fastening members, a mounting plate perpendicularly extended from a second end thereof, said mounting plate having a plurality of mounting through holes for fastening to a support.

2. The non-backboard reflector mirror as claimed in claim 1, wherein said mirror body has a recess at a back side thereof.

3. The non-backboard reflector mirror as claimed in claim 1, wherein said mirror body is made out of stainless steel.

4. The non-backboard reflector mirror as claimed in claim 1, wherein said mirror body is made out of polycarbonate.

5. The non-backboard reflector mirror as claimed in claim 1, wherein said mounting frame further comprises a plurality of mounting through holes disposed near said mounting plate for mounting.

6. The non-backboard reflector mirror as claimed in claim 1, wherein said mounting frame comprises a reinforcing rib extending to said mounting plate.

7. A non-backboard reflector mirror comprising:
   a mirror body, said mirror body having a reflecting mirror surface at a front side thereof and a rim extending around the periphery of aid reflecting mirror surface;
   a locating bar, said locating bar having a first flat end portion and a second flat end portion respectively affixed to the rim of said mirror body with fastening members;
   a locating frame, said locating frame comprising a flat mounting portion, a flat connection portion, and an arched clamping portion connected between said flat mounting portion and said flat connection portion, said flat mounting portion having a plurality of first mounting through holes arranged in an array remote from said arched clamping portion and a plurality of second mounting through holes arranged at different elevations adjacent to said arched clamping portion, said arched clamping portion defining a tubular receiving space, which receives said locating bar, said flat connection portion having a plurality of mounting through holes respectively fastened to the second mounting through holes of said flat mounting portion with screws and nuts to affix said arched clamping portion to said locating bar; and
   a mounting frame for securing said locating frame to a support, said mounting frame comprising a flat mounting portion, a flat connection portion, and an arched clamping portion connected between the flat mounting portion and the flat connection portion of said mounting frame, the flat mounting portion comprising a first mounting through hole and a smoothly arched mounting slot disposed near one end thereof and selectively fastened to the first mounting through holes of the flat mounting portion of said locating frame at the desired elevation and angle with fastening members and a plurality of second mounting through holes disposed at different elevations adjacent of the arched clamping portion of said mounting frame for fastening to the flat mounting portion of said mounting frame, the arched clamping portion of said mounting frame defining a tubular receiving space for securing to a post, the flat connection portion of said mounting frame extending from one end of the arched clamping portion of said mounting frame and having a plurality of mounting through holes fastened to the second mounting through holes of the flat mounting portion of said mounting frame with fastening members to affix the arched clamping portion of said mounting frame to a post.

8. The non-backboard reflector mirror as claimed in claim 7, wherein said mirror body has a recess at a back side thereof.

9. The non-backboard reflector mirror as claimed in claim 7, wherein said mirror body is made out of stainless steel.

10. The non-backboard reflector mirror as claimed in claim 7, wherein said mirror body is made out of polycarbonate.

* * * * *